(12) United States Patent
Smith

(10) Patent No.: US 6,572,832 B2
(45) Date of Patent: Jun. 3, 2003

(54) METHOD OF REMOVING SULFUR DIOXIDE FROM A GASEOUS STREAM IN A WET SCRUBBING UNIT

(75) Inventor: Kevin J. Smith, Monongahela, PA (US)

(73) Assignee: Carmeuse North America Services, Inc., Pittsburgh, PA (US)

(*) Notice: Subject to any disclaimer, the term of this patent is extended or adjusted under 35 U.S.C. 154(b) by 97 days.

(21) Appl. No.: 09/817,939

(22) Filed: Mar. 27, 2001

(65) Prior Publication Data

US 2002/0141922 A1 Oct. 3, 2002

(51) Int. Cl.$^7$ .................................. B01D 53/50
(52) U.S. Cl. ........................ 423/243.08; 423/243.09
(58) Field of Search ..................... 423/243.08, 243.09

(56) References Cited

U.S. PATENT DOCUMENTS

| | | | |
|---|---|---|---|
| 3,914,378 A | 10/1975 | Selmeczi | 423/242 |
| 3,919,393 A | 11/1975 | Selmeczi | 423/242 |
| 3,919,394 A | 11/1975 | Selmeczi | 423/242 |
| 4,046,856 A | 9/1977 | Itoo et al. | 423/166 |
| 4,193,971 A | 3/1980 | Kaweamata et al. | 423/242 |
| 4,246,245 A | 1/1981 | Abrams et al. | 423/242 |
| 4,804,523 A | 2/1989 | Abrams et al. | 423/242 |
| 4,976,936 A | 12/1990 | Rathi et al. | 423/242 |
| 4,996,032 A | 2/1991 | Stowe, Jr. et al. | 423/242 |
| 5,039,499 A | 8/1991 | Stowe, Jr. | 423/242 |
| 5,084,255 A | 1/1992 | College et al. | 423/242 |
| 5,270,026 A | 12/1993 | College et al. | 423/243.08 |
| 5,614,158 A | 3/1997 | College | 423/166 |
| 5,645,807 A | 7/1997 | College et al. | 423/243.1 |
| 5,676,915 A | * 10/1997 | Iiyama et al. | 423/243.01 |

* cited by examiner

*Primary Examiner*—Stanley S. Silverman
*Assistant Examiner*—Timothy C Vanoy
(74) *Attorney, Agent, or Firm*—Armstrong, Westerman & Hattori, LLP

(57) ABSTRACT

Sulfur dioxide is removed from a gaseous stream using an aqueous scrubbing slurry of magnesium and calcium scrubbing components where the process is carried out where lime and magnesium hydroxide are blended to give a molar ratio of between about 1.0 to 2.0, so as to provide a solids content in the aqueous scrubbing slurry of between about 12 to 20 percent, which includes about 10 to 15 percent suspended solids and 2 to 5 percent dissolved solids, and a dissolved sulfite content of about 13,000 to 20,000 ppm and a pH of between about 5.8–6.0.

5 Claims, 1 Drawing Sheet

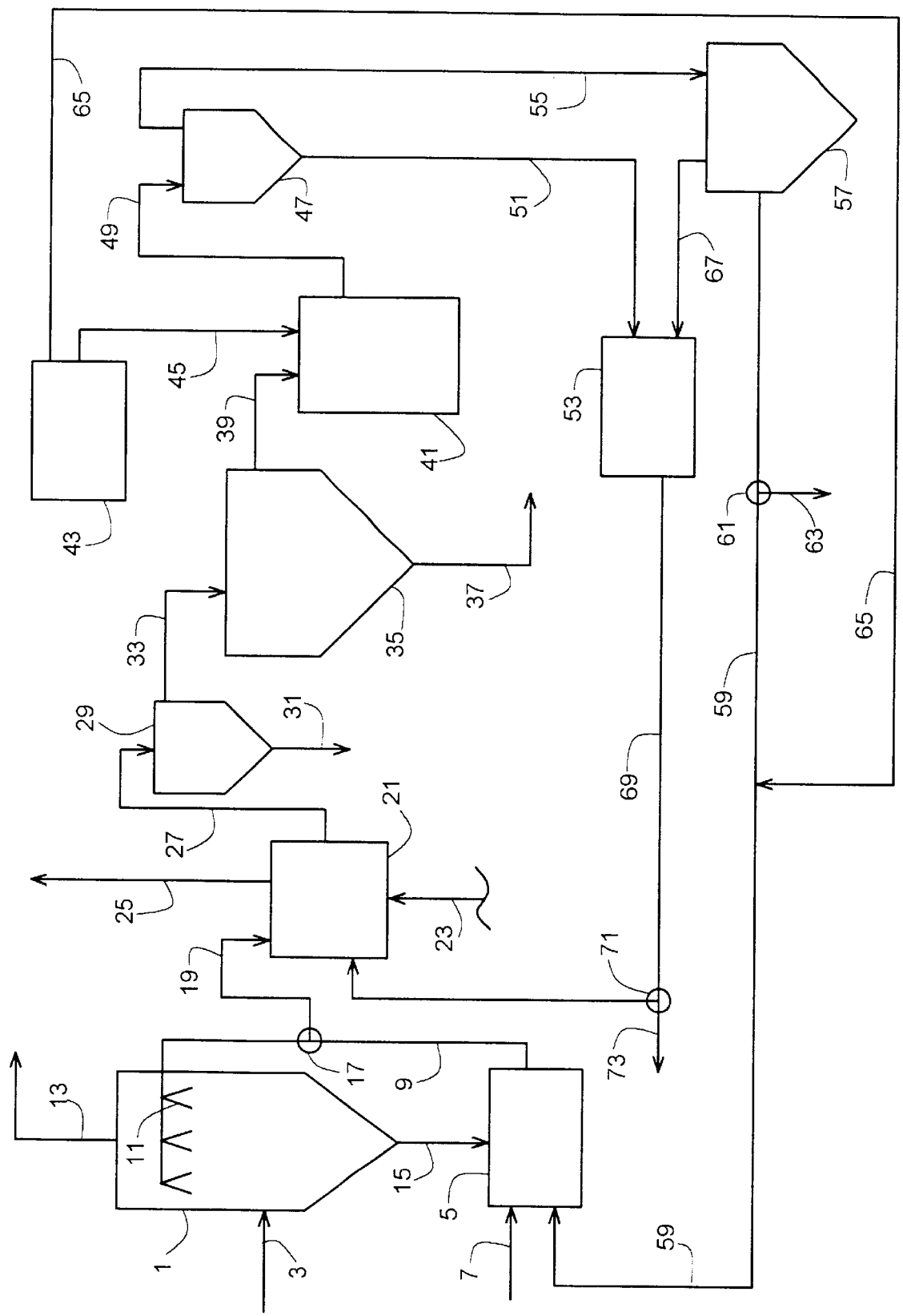

METHOD OF REMOVING SULFUR DIOXIDE FROM A GASEOUS STREAM IN A WET SCRUBBING UNIT

BACKGROUND OF THE INVENTION

Wet scrubbing methods for the removal of sulfur dioxide from gases, such as flue gases from the combustion of fossile fuels, using lime or magnesium as the scrubbing component, have concentrated on two major systems. One method uses a magnesium-enhanced lime aqueous scrubbing slurry, while the other uses an aqueous solution of magnesium scrubbing components, with regeneration of the spent solution using lime or a magnesium-enhanced lime.

Illustrative of the methods that use an aqueous scrubbing slurry containing magnesium-enhanced lime are those methods described in U.S. Pat. Nos. 3,914,378; 3,919,393; 3,919,394; 4,976,936; 4,996,032; and 5,645,807. In such methods, an aqueous slurry of lime contains magnesium ions or magnesium hydroxide in an amount of 250–5000 parts per million (ppm), or 2–10% by weight, in the wet scrubbing unit used for contact of the gas and aqueous scrubbing slurry. The aqueous magnesium-enhanced lime scrubbing slurry is contacted with the sulfur-dioxide containing gas in a wet scrubbing unit with formation of calcium sulfite that is either disposed of or oxidized and converted to gypsum, a useful by-product.

Illustrative of the methods that use an aqueous solution of magnesium scrubbing components, such as magnesium hydroxide, magnesium bisulfite or magnesium sulfite, are those described in U.S. Pat. Nos. 4,804,523, 5,039,499; 5,084,255; 5,270,026; and 5,614,158.

While both the method using an aqueous slurry of magnesium-enhanced lime and the method using an aqueous solution of magnesium scrubbing compounds have been shown to be commercially viable, improvements to those methods are constantly sought.

In the methods according to U.S. Pat. Nos. 5,039,499 and 5,084,255, for example, where byproduct gypsum and magnesium hydroxide are to be produced, the method uses a magnesium hydroxide slurry alone as the scrubbing component for sulfur dioxide removal in the wet scrubber and is very efficient. However, at times, the rate of bleed stream removal from the wet scrubbing unit is not sufficiently great enough and an objectionable level of magnesium sulfite can exist in the wet scrubbing unit.

SUMMARY OF THE INVENTION

The present method of removing sulfur dioxide from a gaseous stream in a wet scrubbing unit where an aqueous scrubbing slurry of magnesium and calcium scrubbing components are provided to convert the sulfur dioxide to sulfites and sulfates and producing calcium sulfate dihydrate from an aqueous effluent from the wet scrubbing unit, which aqueous effluent contains the sulfites and sulfates includes providing an aqueous scrubbing slurry by blending lime and magnesium hydroxide in a ratio to provide a molar ratio of Ca:Mg of between about 1.0 to 2.0, so as to provide a solids content in said aqueous scrubbing slurry in the wet scrubbing unit of between about 12 to 20% preferably about 15%, which solids content includes about 10 to 15% preferably about 11%, suspended solids and about 2 to 5%, preferably about 4%, dissolved solids, a dissolved sulfite content of about 13,000 to 20,000, ppm, and a pH of between about 5.8–6.0.

An aqueous effluent is discharged from the wet scrubbing unit containing the solids content, dissolved sulfites and pH and is passed to an oxidizing unit.

The aqueous effluent is contacted in the oxidizing unit with an oxidizing gas to convert sulfites therein to sulfates and produce an oxidized aqueous effluent containing dissolved magnesium sulfate, precipitated calcium sulfate dihydrate, and residual calcium sulfate dihydrate. The calcium sulfate dihydrate is precipitated from the aqueous effluent, and the oxidized aqueous containing dissolved magnesium sulfate and residual calcium sulfate dihydrate is passed to a regeneration tank, where the oxidized aqueous effluent is contacted with a lime slurry, to produce magnesium hydroxide and further precipitated calcium sulfate dihydrate in an aqueous medium. The further precipitated calcium sulfate dihydrate is separated from the aqueous medium to provide an aqueous medium containing magnesium hydroxide, and at least a portion of the aqueous medium containing magnesium hydroxide is returned to the wet scrubbing unit.

BRIEF DESCRIPTION OF THE DRAWING

The invention will become more readily apparent from the following description of a preferred embodiment thereof, shown by way of example, in the accompanying drawing which is a schematic illustration of the method of the present invention.

DETAILED DESCRIPTION

The present method enable the removal of sulfur dioxide from a gaseous stream with production of gypsum (calcium sulfate dihydrate) and magnesium hydroxide as saleable by-products.

Referring to the drawing, which schematically illustrates the present invention, 1 is a wet scrubbing unit to which a gaseous stream containing sulfur dioxide is fed through line 3. An aqueous slurry of magnesium and calcium scrubbing components for removal of the sulfur dioxide is initially fed to a recycle tank 5 though line 7, the aqueous slurry passed through line 9 to spray devices 11 and downwardly through the wet scrubbing unit 1 so as to flow countercurrent to the gaseous stream, with sulfur dioxide reacting with the magnesium and calcium scrubbing components, so as to remove the sulfur dioxide from the gaseous stream and a clean gas stream is discharged from the wet scrubbing unit 1 through line 13. The sulfur dioxide is converted to sulfites and sulfates the aqueous medium and is passed to recycle tank 5 through line 15.

A portion of the aqueous medium containing sulfites and sulfates is discharged from the wet scrubbing unit, such as through valve 17 to off-take line 19, as an aqueous effluent containing a solids content of between about 12 to 20 percent, which includes about 10 to 15 percent suspended solids and about 2 to 5 percent dissolved solids, and containing a dissolved sulfite content of about 13,000 to 20,000 parts per million (ppm), and is at a pH of between about 5,8–6.0.

The aqueous effluent from line 19 is passed to an oxidizing unit 21. Oxygen, or other oxidizing gas, such as air, is charged to the oxidizing unit 21 through line 23 and the aqueous effluent is contacted with oxygen and converts sulfites in the aqueous effluent to sulfates, so as to produce an oxidized aqueous effluent containing dissolved magnesium sulfate, precipitated calcium sulfate dihydrate, and residual calcium sulfate dihydrate, with excess oxidized gas discharged through line 25. The oxidized aqueous effluent is passed through line 27 to an initial solids separator 29, such as a hydroclone, where precipitated calcium sulfate dihydrate is separated and removed through discharge line 31.

The oxidized aqueous effluent, may then be passed to a further solids separator 35, though line 33, to remove fine material therefrom, with further precipitated calcium sulfate dihydrate discharged through line 37. The oxidized aqueous effluent, after removal of precipitated calcium sulfate dihydrate therefrom, and now containing magnesium sulfate and residual calcium sulfate dihydrate, is passed through line 39 to a regeneration tank 41. A lime slurry, formed in lime slaker 43 is charged to the regeneration tank 41 through line 45, with the lime reacting with magnesium sulfate present in the oxidized aqueous effluent to produce magnesium hydroxide and further precipitated calcium sulfate dihydrate in the aqueous medium. The aqueous medium containing magnesium hydroxide and further precipitated calcium sulfate dihydrate is passed to a separator 47 through line 49, the further precipitated calcium sulfate dihydrate is separated and removed through line 51 to a calcium sulfate dihydrate collector 53. After separation of the further precipitated calcium sulfate dihydrate therefrom, an aqueous medium results that contains magnesium hydroxide, which aqueous medium is removed through line 55 and passed to a final magnesium hydroxide separator 57.

From the magnesium hydroxide separator 57, a portion of the aqueous medium containing magnesium hydroxide is returned to the recycle tank 5 and thus to the wet scrubbing unit 1 through line 59, while any excess magnesium hydroxide may be removed through valve 61 and discharge line 63 for sale as a by-product of the method.

In order to provide the desired Ca:Mg ratio in the aqueous scrubbing slurry in the wet scrubbing unit 1, a portion of lime slurry from lime slaker 43 is passed through line 65 and mixed with the magnesium hydroxide fed through line 59 to the recycle tank 5.

Any sulfates remaining in the aqueous medium in the final magnesium hydroxide separator 57 are passed through line 67 to the calcium sulfate dihydrate collector 53. From the calcium sulfate dihydrate collector 53, a portion of the calcium sulfates dihydrate is returned to oxidizer 21 through line 69, which excess calcium sulfate dihydrate is removed through valve 71 and discharge line 73.

The aqueous slurry used in the present method is prepared by blending lime and magnesium hydroxide, in water, in a ratio that will provide a molar ratio of Ca:Mg of between about 1.0:2.0.

The molar ratio of calcium to magnesium in the reagent fed to the scrubber is an independent parameter that determines the proportion of removed sulfur dioxide that forms soluble magnesium sulfite/bisulfite and solid phase calcium sulfite hemihydrate in the scrubber circuit. As the calcium to magnesium molar ratio of the reagent slurry fed to the scrubber increases, proportionally more sulfur dioxide is reacted to form the solid phase calcium sulfite hemihydrate and less sulfur dioxide is reacted to form the soluble magnesium sulfite/bisulfite and vice versa.

The right balance of calcium sulfite to magnesium sulfite/bisulfite is that which simultaneously produces scrubber liquor chemistry that is sufficiently alkaline to achieve sulfur dioxide emission compliance and produce a slurry that, when fed to a properly configured external oxidizer, will produce conditions within the oxidizer that will convert all calcium sulfite hemihydrate to gypsum without using an external source of sulfuric acid that is typically required.

A calcium to magnesium molar ratio that is too low (<1.0) will produce a scrubber slurry that is too rich in magnesium sulfite/bisulfite and too low in suspended solids to allow the external oxidizer to crystallize gypsum that is easily filterable. Magnesium sulfite liquid phase concentration can become elevated to levels that cause uncontrolled precipitation leading to equipment damage and process upset.

A calcium to magnesium molar ratio that is too high (>2.0) produces scrubber slurry chemistry that will be too weak in magnesium sulfite/bisulfite and too high in suspended solids for the scrubber to keep its mist eliminators clean. Weak scrubber chemistry can lead to $SO_2$ emission noncompliance and pH excursions within the oxidizer causing incomplete calcium sulfite oxidation.

The molar ratio specified is used to provide a solids content in the aqueous scrubbing slurry in the wet scrubbing unit of between about 12 to 20 percent, with suspended solids in a range of about 10 to 15 percent and dissolved solids in an amount of about 2 to 5 percent. Preferably, the solids content is about 15 percent, which includes about 11 percent suspended solids and about percent dissolved solids.

Solids content (12 to 20%) is specifically total solids and is the sum of suspended solids (10 to 15%) and dissolved solids (2 to 5%). Suspended and dissolved solids are manipulated within the scrubber circuit by a combination of varying the calcium to magnesium molar ratio and scrubber slurry bleed-rate to the oxidizer. An increase in calcium to magnesium molar ratio without any adjustment in scrubber bleed-rate to the oxidizer causes suspended solids to rise and dissolved solids to decrease and vice versa. Suspended and dissolved solids also are influenced by the slurry bleed rate from the scrubber to the oxidizer. A calcium to magnesium molar ratio within the range of 1.0:2.0 combined with appropriate adjustments in scrubber bleed-rate to the oxidizer strikes a balance between suspended and dissolved solids that allows the scrubber and oxidizer to each operate optimally.

Suspended solids can exceed a scrubbers ability to maintain clean mist eliminators (>15%). At any given calcium to magnesium molar ratio, as suspended solids (calcium based reaction products) rise, typically dissolved solids (magnesium based reaction products) decrease. Dissolved solids are the source of alkalinity that is responsible for $SO_2$ removal and the source of acid the oxidizer requires to maintain pH in the range that allows oxidation to proceed to completion. Too little dissolved solids (<2%) can lead to insufficient $SO_2$ removal and an inability to sustain oxidizer pH in the range required to oxidize calcium sulfite to gypsum. A minimum amount scrubber suspended solids is required by the oxidizer (>10%) to promote sufficient gypsum crystallization that produces a filterable product. Dissolved solids greater than 4% is the situation referred earlier that can lead to uncontrolled precipitation of magnesium sulfite within the process.

What is claimed is:

1. A method of removing sulfur dioxide from a gaseous stream in a wet scrubbing unit where an aqueous scrubbing slurry of magnesium and calcium scrubbing components are provided to convert the sulfur dioxide to sulfites and sulfates and producing calcium sulfate dihydrate from an aqueous effluent from the wet scrubbing unit, which aqueous effluent contains the sulfites and sulfates, comprising:

providing said aqueous scrubbing slurry by blending lime and magnesium hydroxide in a ratio to provide a molar ratio of Ca:Mg of between about 1.0 to 2.0:1, so as to provide a solids content in said aqueous scrubbing slurry in the wet scrubbing unit of between about 12 to 20%, which solids content includes about 10 to 15% suspended solids and about 2 to 5% dissolved solids, a dissolved sulfite content of about 13,000 to 20,000 ppm, and a pH of between about 5.8–6.0;

discharging aqueous effluent from the wet scrubbing unit containing said solids content, dissolved sulfites and pH and passing the same to an oxidizing unit;

contacting said aqueous effluent in said oxidizing unit with an oxidizing gas to convert sulfites therein to sulfates and produce an oxidized aqueous effluent containing dissolved magnesium sulfate, precipitated calcium sulfate dihydrate, and residual unprecipitated calcium sulfate dihydrate;

separating said precipitated calcium sulfate dihydrate from said oxidized aqueous effluent;

passing said oxidized aqueous effluent containing dissolved magnesium sulfate and residual unprecipitated calcium sulfate dihydrate to a regeneration tank;

contacting said oxidized aqueous effluent in said regeneration tank with lime slurry, from a lime slaker, to produce magnesium hydroxide and further precipitated calcium sulfate dihydrate in an aqueous medium;

separating said further precipitated calcium sulfate dihydrate from said aqueous medium to provide an aqueous medium containing magnesium hydroxide; and returning at least a portion of said aqueous medium containing magnesium hydroxide to said wet scrubbing unit.

2. The method of removing sulfur dioxide from a gaseous stream in a wet scrubbing unit as defined in claim 1 wherein the solids content in the aqueous scrubbing slurry in the wet scrubbing unit is about 15%.

3. The method of removing sulfur dioxide from a gaseous stream in a wet scrubbing unit as defined in claim 2 wherein the solids content includes about 11% suspended solids.

4. The method of removing sulfur dioxide from a gaseous stream in a wet scrubbing unit as defined in claim 2 wherein the solids content includes about 4% dissolved solids.

5. A method of removing sulfur dioxide from a gaseous stream in a wet scrubbing unit where an aqueous scrubbing slurry of magnesium and calcium scrubbing components are provided to convert the sulfur dioxide to sulfites and sulfates and producing calcium sulfate dihydrate from an aqueous effluent from the wet scrubbing unit, which aqueous effluent contains the sulfites and sulfates, comprising:

providing said aqueous scrubbing slurry by blending lime and magnesium hydroxide in a ratio to provide a molar ratio of Ca:Mg of between about 1.0 to 2.0:1, so as to provide a solids content in said aqueous scrubbing slurry in the wet scrubbing unit of about 15%, which solids content includes about 11% suspended solids and about 4% dissolved solids, a dissolved sulfite content of about 13,000 to 20,000 ppm, and a pH of between about 5.8–6.0;

discharging aqueous effluent from the wet scrubbing unit containing said solids content, dissolved sulfites and pH and passing the same to an oxidizing unit;

contacting said aqueous effluent in said oxidizing unit with an oxidizing gas to convert sulfites therein to sulfates and produce an oxidized aqueous effluent containing dissolved magnesium sulfate, precipitated calcium sulfate dihydrate, and residual unprecipatated calcium sulfate dihydrate;

separating said precipitated calcium sulfate dihydrate from said oxidized aqueous effluent;

passing said oxidized aqueous effluent containing dissolved magnesium sulfate and residual unprecipitated calcium sulfate dihydrate to a regeneration tank;

contacting said oxidized aqueous effluent in said regeneration tank with lime slurry, from a lime slaker, to produce magnesium hydroxide and further precipitated calcium sulfate dihydrate in an aqueous medium;

separating said further precipitated calcium sulfate dihydrate from said aqueous medium to provide an aqueous medium containing magnesium hydroxide; and returning at least a portion of said aqueous medium containing magnesium hydroxide to said wet scrubbing unit.

* * * * *